United States Patent [19]

Hehl

[11] 3,761,214

[45] Sept. 25, 1973

[54] INJECTION MOLDING MACHINE CONVERTIBLE TO SEVERAL DIFFERENT ASSEMBLY CONFIGURATIONS

[76] Inventor: Karl Hehl, Lossburg/Wuerttg., Germany

[22] Filed: Mar. 13, 1972

[21] Appl. No.: 234,034

[30] Foreign Application Priority Data
Mar. 15, 1971 Germany.................. P 21 12 310.4
Mar. 15, 1971 Germany.................. P 21 12 317.8

[52] U.S. Cl............................... 425/192, 425/242
[51] Int. Cl.............................................. B29f 1/00
[58] Field of Search.................... 425/186, 190, 192, 425/193, 195, 242, 250, 450

[56] References Cited
UNITED STATES PATENTS
3,564,658 2/1971 Hehl .............................. 425/192 X
3,596,325 8/1971 Hehl ................................ 425/192
3,674,400 7/1972 Sauerbruch........................ 425/242

Primary Examiner—J. Spencer Overholser
Assistant Examiner—David S. Safran
Attorney—Arthur Schwartz et al.

[57] ABSTRACT

An injection molding machine whose basic operating unit are designed as standardized building blocks for conversion to several different assembly configurations, the machine consisting essentially of a rectangular block-shaped machine frame with horizontal and vertical mounting faces; a die and die-actuating unit with a rectangular block-shaped cylinder mount; at least one injection unit with centering means for axial injection in the center axis of the cylinder mount, or radial injection in the separation plane of the molding die; and depending on the desired assembly configuration, a bar-shaped, L-shaped, T-shaped, or P-shaped angular mounting bracket for the mutual attachment and alignment of the die-actuating unit, injection unit and machine frame.

21 Claims, 33 Drawing Figures

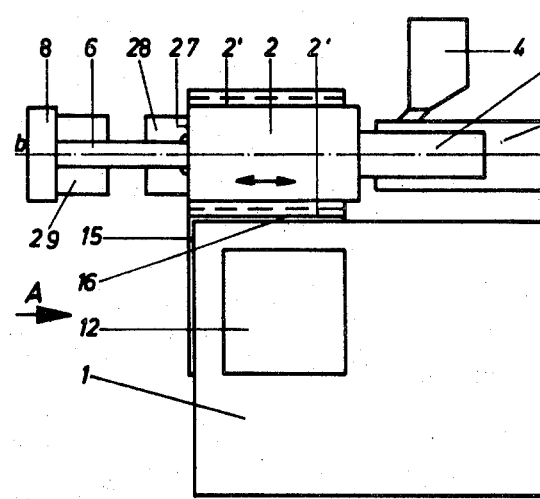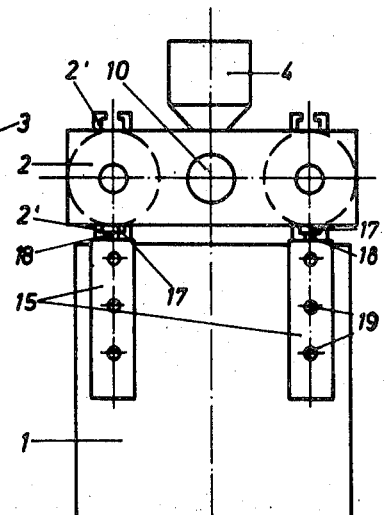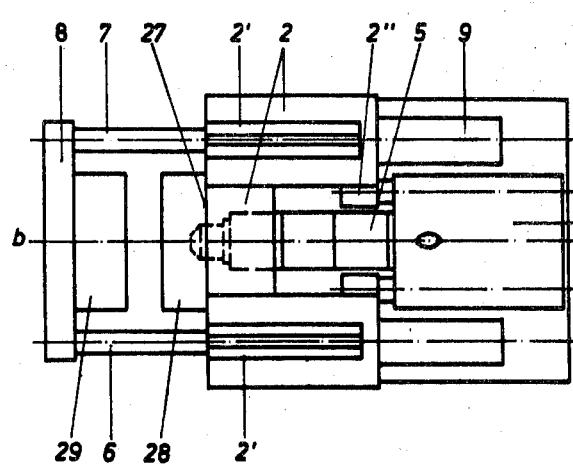

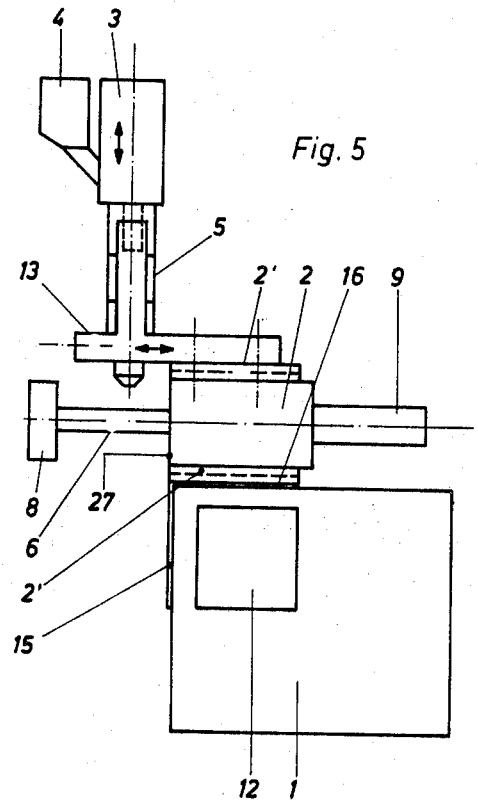
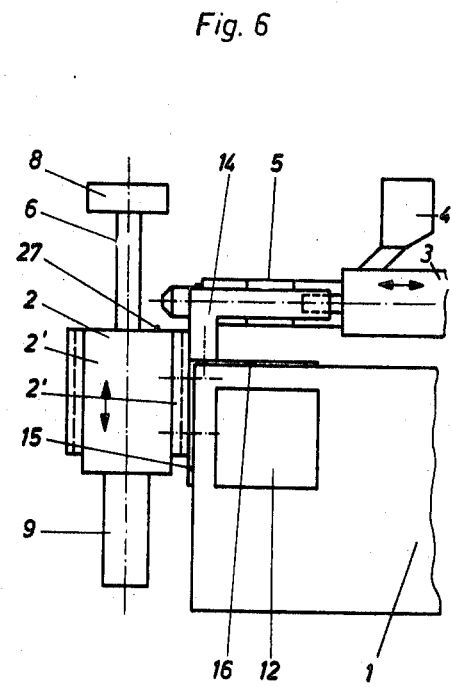
Fig. 5  Fig. 6
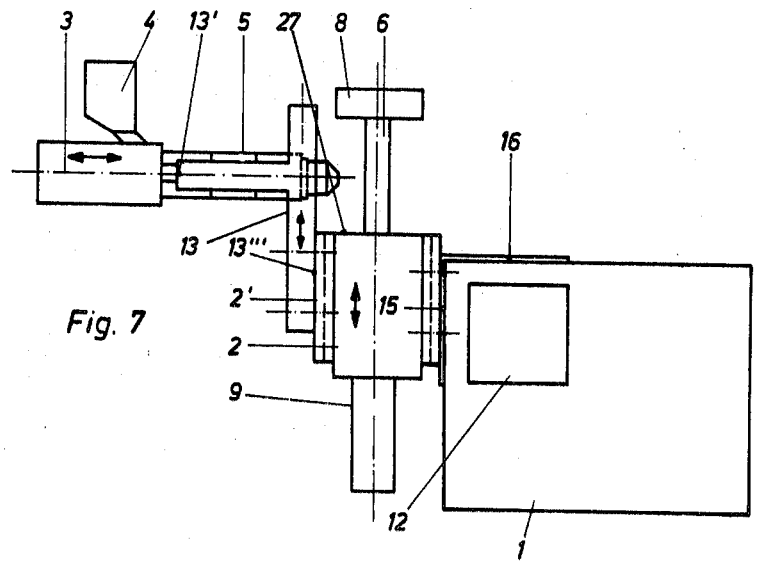
Fig. 7

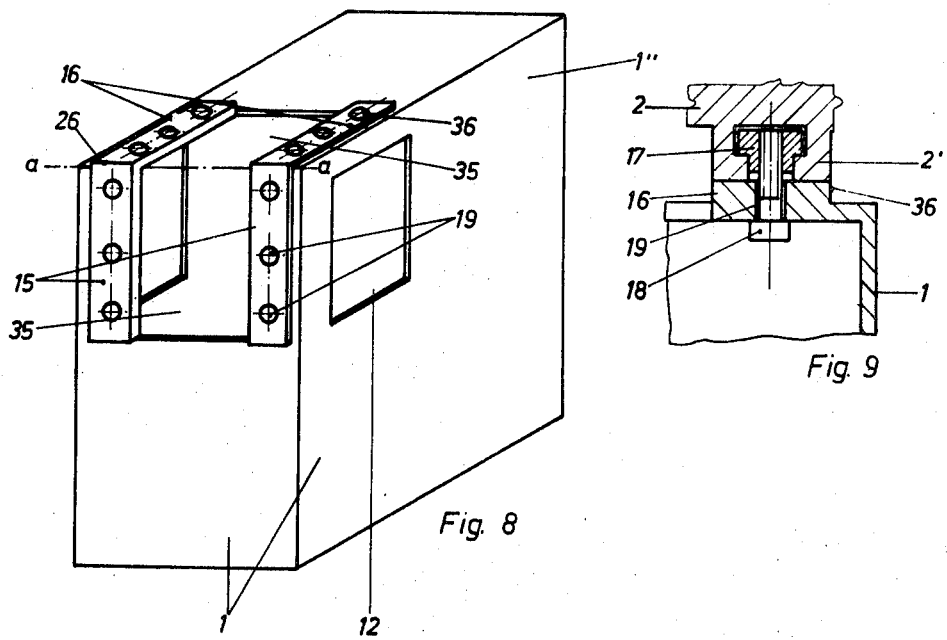
Fig. 8
Fig. 9
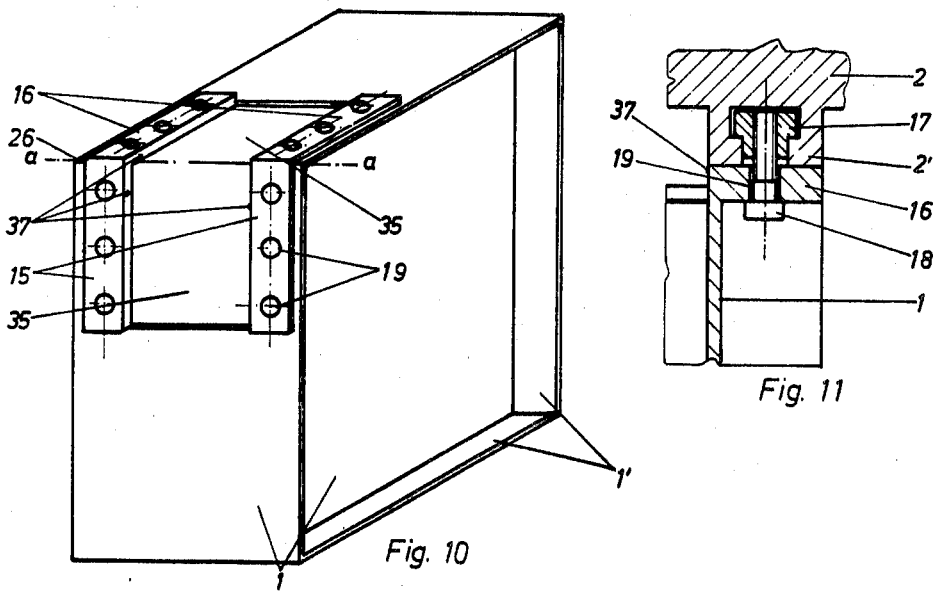
Fig. 10
Fig. 11

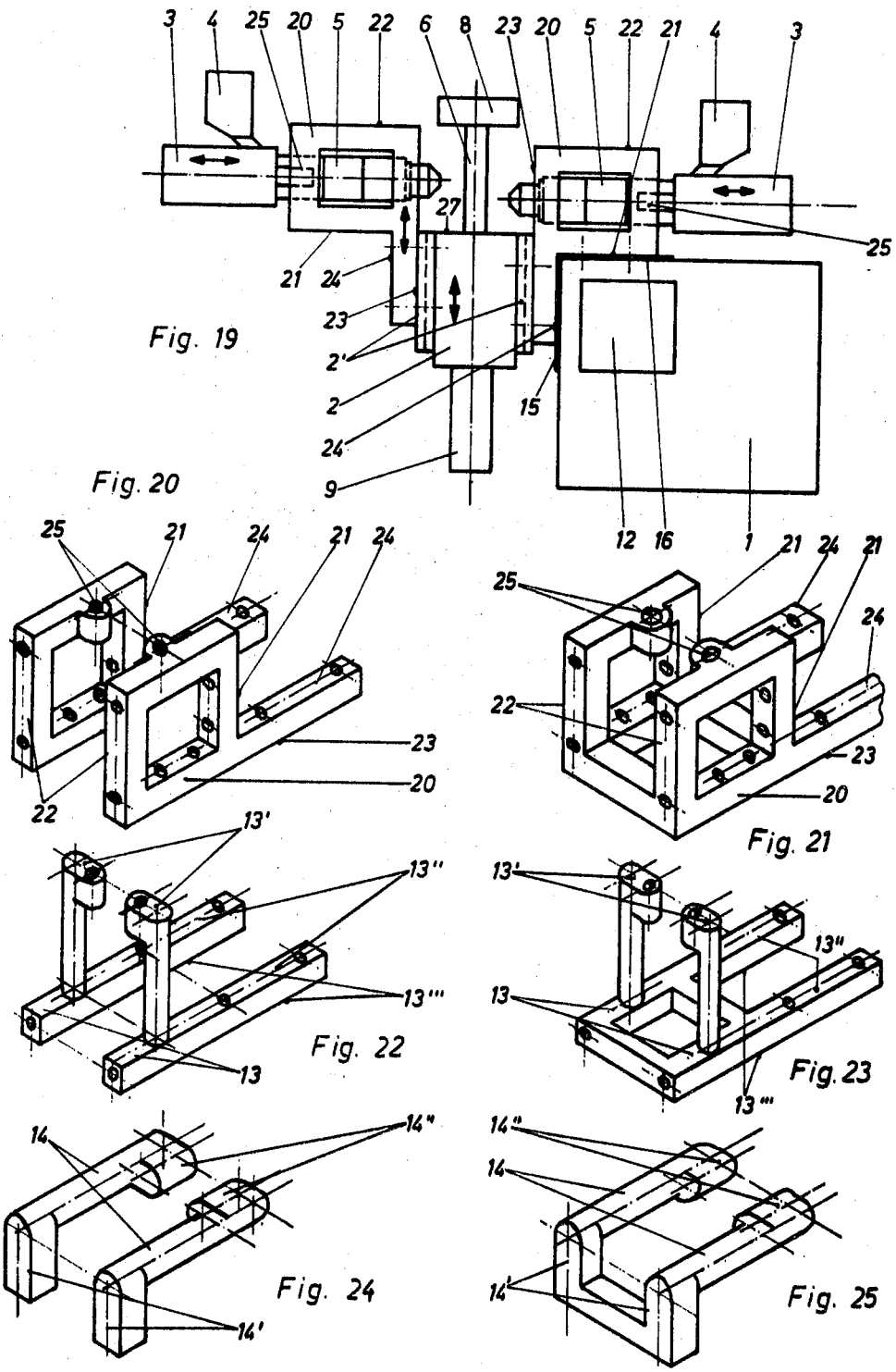

INJECTION MOLDING MACHINE CONVERTIBLE TO SEVERAL DIFFERENT ASSEMBLY CONFIGURATIONS

BACKGROUND OF THE INVENTION

1. Field of the Invention

The invention relates to injection molding machines, and in particular to injection molding machines for synthetic plastics, the machine having a rectangular block frame and a die-actuating unit designed for horizontal and vertical mounting on the frame, including at least one injection unit for either radial injection in the separation plane of the die or for axial injection perpendicularly to the separation plane of the die.

2. Description of the Prior Art

The prior art includes an injection molding machine (U.S. Pat. No. 3,068,520) which includes a die-actuating unit which can be mounted either horizontally or vertically, in order to permit injection of the raw material into either the separation plane of the die or perpendicularly thereto. This machine thus has the capabilities of a multi-purpose machine, permitting conversion to several working positions, as the case may require. However, this prior art machine is very complex in construction, thus expensive as an investment, and its adaptability is still limited.

SUMMARY OF THE INVENTION

It is a primary objective of the present invention to propose an injection molding machine of the earlier mentioned kind which is so constructed that even heavy versions of the machine give the user all the necessary conversion possibilities, while being inexpensive in production and equivalent to a single-purpose machine as an investment.

The invention proposes to attain the above objective by suggesting an injection molding machine which is constructed as a combination of building blocks whose advantages and characteristics are as follows:

a. The machine frame has horizontal and vertical mounting faces adjacent to one of the upper transverse edges;

b. The stationary portion of the molding die is attached to the forward transverse face of the cylinder mount, i.e., a mounting block for the die-actuating cylinders known as such, while the movable portions of the molding die are attached to the outer ends of the actuating cylinders;

c. The plastifying cylinder extends centrally through the cylinder mount, and the latter includes on one of each longitudinal face mounting elements for a direct attachment to one of the mounting faces on the machine frame, on a second longitudinal face mounting elements for the attachment of the carriage of an injection unit which is aligned with the separation plane of the die, and on one of its transverse faces additional self-centering mounting elements for the attachment of the injection unit carriage, when the letter is to be aligned for axial injection.

The savings realized with this arrangement simplify the fabrication of the machine, especially as regards the previously required expensive pivoting devices and transpositioning devices, particularly where heavy machines were involved. In the novel arrangement of the invention the cylinder mount becomes the direct or indirect support and centering element for all the hydraulic actuating cylinders, for the injection molding die, and for practically all the different mounting arrangements of the injection units, the cylinder mount itself being attachable to either the horizontal or vertical mounting face of the machine frame.

The term "transverse edge of the machine frame" is to be understood as meaning a generally linear transverse edge of the machine frame which is perpendicular to the direction of die opening and closing motion produced by the die-actuating unit.

The term "actuating cylinder" refers to those hydraulic cylinders which create the closing pressure on the injection molding die.

The term "transverse face of the cylinder mount" refers to an end face of the cylinder mount which is perpendicular to the actuating cylinders which are arranged in the cylinder mount.

The term "longitudinal face of the cylinder mount" refers to an outside face of the cylinder mount which is parallel to the actuating cylinders which are arranged in the cylinder mount.

The solution suggested by the invention offers several decisive advantages for both the manufacturer and the user: It permits the manufacturer to produce only standardized basic building blocks (such as machine frames, cylinder mounts, injection units, and carriages for the injection units), thereby greatly simplifying his production scheduling and tooling, while increasing productivity through standardization. The user obtains for a comparatively small investment an injection molding machine composed of a number of basic building blocks, but selected in accordance with the special requirements of the user. If the user is later faced with different requirements, such as a new arrangement of the die-actuating unit, his machine can be converted to a different single-purpose machine by rearranging the building blocks. Thus, the user obtains a multi-purpose machine at a minimal investment.

BRIEF DESCRIPTION OF THE DRAWINGS

Further special features and advantages of the invention will become apparent from the description following below, when taken together with the accompanying drawings which illustrate, by way of examples, several embodiments of the invention, represented in the various figures as follows:

FIG. 1 shows in a schematic outline an elevational front view of an injection molding machine embodying the invention;

FIG. 2 shows the machine of FIG. 1 in an elevational side view;

FIG. 3 is a plane view of the machine of FIG. 1 (die carrier omitted);

FIG. 4 shows an injection molding machine similar to that of FIGS. 1 to 3, but with the die-actuating unit in a vertical position;

FIG. 5 shows the injection molding machine of FIG. 1 modified so that the injection unit is aligned with the separation plane of the die;

FIGS. 6 and 7 show similar arrangements of the injection molding machine of FIG. 4 modified so that the injection unit is aligned with the separation plane of the die;

FIG. 8 shows in perspective view a machine frame for the injection molding machine of the invention;

FIG. 9 shows an enlarged cross-sectional detail of the machine frame of FIG. 8;

FIG. 10 shows, in a perspective view similar to that of FIG. 8, a modified version of the machine frame;

FIG. 11 again shows an enlarged cross-sectional detail of the machine frame of FIG. 10;

FIGS. 16–19 show the injection molding machine of FIG. 15 in three different mounting arrangements, whereby the version of FIG. 18 includes two of the P-shaped mounting brackets;

FIG. 20 shows, in an enlarged perspective view, a first version of the P-shaped mounting bracket of the third embodiment;

FIG. 21 shows a second version of the P-shaped mounting bracket, similar to that of FIG. 20;

FIG. 22 shows in a similar cross-sectional view a T-shaped mounting bracket, usable in place of the P-shaped mounting bracket;

FIG. 23 shows again an alternate version of the T-shaped mounting bracket;

FIG. 24 shows, again in an enlarged perspective view, an L-shaped mounting bracket usable in Place of the earlier-mentioned mounting brackets;

FIG. 25 again shows an alternate version of an L-shaped mounting bracket;

DESCRIPTION OF THE PREFERRED EMBODIMENTS

Figure 12:
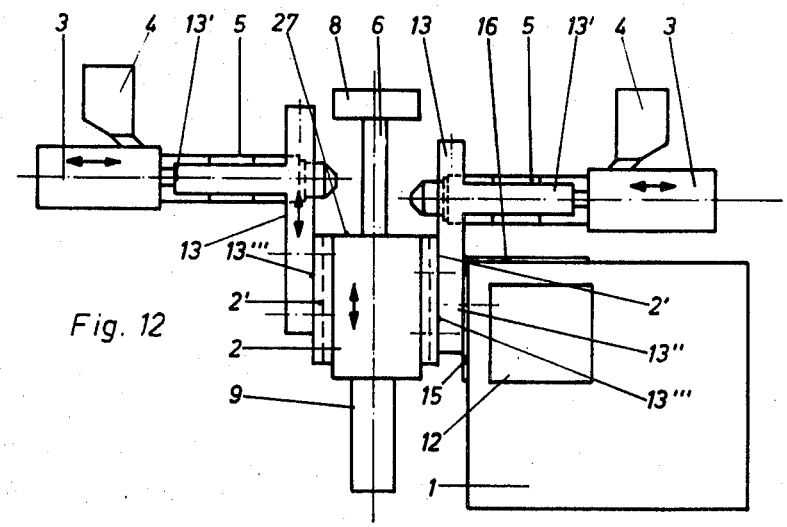
FIG. 12 shows in an elevational front view an injection molding machine with a T-shaped mounting bracket, representing a second embodiment of the invention.
Figure 13:
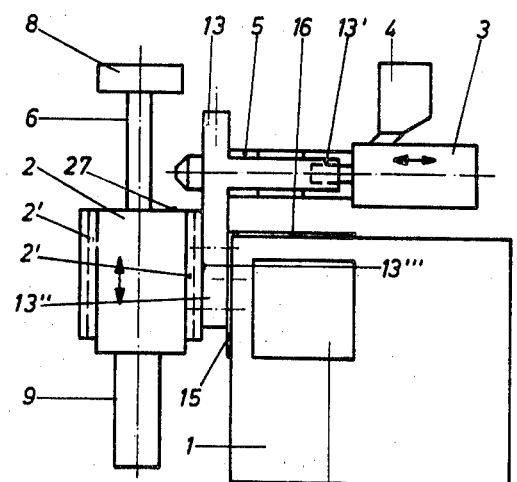
FIGS. 13 and 14 show the injection molding machine of FIG. 12 in two different mounting arrangements.

In FIG. 1 is illustrated schematically an injection molding machine whose rectangular, block-shaped machine frame includes adjacent to its upper forward transverse edge 26 a horizontal mounting face 15 and a vertical mounting face 16. This "upper transverse edge" 26 of frame 1 represents a line $a$—$a$ (FIGS. 8, 10) which is perpendicular to the longitudinal center axis $b$—$b$ (FIGS. 1, 3 and 4) of the die-actuating unit.

The die-actuating unit is composed of a cylinder mount 2 in which are arranged the hydraulic cylinders 9 which actuate the opening and closing of the molding die and, as the case may be, additional hydraulic cylinders for the injection molding machine. On its forward transverse base 27 the cylinder mount 2 carries the stationary part 28 of the molding die. The movable part 29 of the molding die is mounted on the outer ends of the pistons 6 which protrude from the actuating cylinders 9.

The cylinder mount 2 includes on at least two of its outer longitudinal faces mounting elements 2' which are so arranged that the cylinder mount can be attached thereby to one of the mounting faces 15 and 16 of the machine frame either directly or indirectly, i.e., in the latter case by interposing a special mounting bracket, as will be described further below.

As can be seen from FIGS. 8 to 11, the vertical and horizontal mounting faces 15 and 16 represent wall portions of a rectangular block-shaped machine frame 1. These mounting faces include each a row of bores 19 for the insertion of mounting bolts 18 (FIGS. 2, 9, 11). The mounting faces themselves are in the form of two spaced narrow face portions whose inner edges 37 form the lateral contour of rectangular openings 35 in the machine frame (FIGS. 8 and 10). The openings 35 join at the line $a$—$a$ so as to form a single large central opening between the mounting face portions 15 and 16. The remaining wall portions adjacent to the mounting faces 15 and 16 are reinforced in order to strengthen the machine frame 1. In the embodiment of FIGS. 8 and 9 the outer edges 36 of the mounting faces 15 and 16 are arranged just slightly inside the outer side walls of the machine frame 1, these walls having transverse rectangular openings therein to facilitate access to the heads of the mounting bolts 18.

In the embodiment shown in FIGS. 10 and 11 the inner edges 37 of the mounting face portions 15 and 16 bordering the openings 35 are approximately in line with the side walls of the machine frame which, in this case, are recessed relative to a ledge 1' surrounding the sides of the frame.

As can be seen in FIG. 2, the cylinder mount 2 includes the two spaced actuating cylinders for the injection molding die, the mount itself having a generally rectangular outline. In certain cases it may be necessary to arrange four actuating cylinders in the cylinder mount, the mount outline then being approximately square. On the other hand, it is also possible to use a square cylinder mount with only two actuating cylinders arranged diagonally (not shown). In each case, the cylinder mount includes a central opening 10 (FIG. 2) through which the plastifying cylinder 5 of an injection unit 3 extends into the molding die, if the injection molding unit 3 is mounted to the rear transverse face of the cylinder mount 2. The cylinder mount 2 includes on at least two of its longitudinal faces mounting elements 2'.

As can be seen in FIGS. 2, 9, and 11 the mounting elements 2' of the cylinder mount 2 are provided with longitudinal T-grooves. Into these grooves fit special T-shaped nuts 17 which are engaged by the bolts 18, thereby clamping the cylinder mount against the mounting face on the machine frame 1. Thus, the cylinder mount may be directly attached to either the horizontal or vertical mounting face or, as will be shown further below, it may be attached to the machine frame by means of an intermediate mounting bracket or other mounting element.

It should be understood, of course, that in the case of a square-shaped cylinder mount, all four of the longitudinal sides thereof may be equipped with mounting elements 2', thus permitting a lateral mounting of the injection units on the cylinder mount 2. To the forward transverse face 27 of the cylinder mount 2 is attached the stationary portion 28 of the injection molding die. The movable die portion 29 is mounted on a carrier bracket 8 which links together the forward ends of the piston rods 6 of the die-actuating cylinder. The cylinder mount 2 also carries hydraulic cylinders 9 which are arranged coaxially with the die-actuating cylinders and which may also be used for the opening and closing of the molding die. The injection unit 3 with its granulate container 4 is mounted directly to the rear transverse face of the cylinder mount.

In the examples shown in FIGS. 1 to 3 and 5, the cylinder mount 2 is directly attached to the horizontal mounting face 16 of the machine frame, in one case carrying an axial injection unit 3, in the case of FIG. 4 without. In that latter case the injection unit 3 is supported by a carriage 13 and aligned for radial injection into the separation plane of the molding die. In the example of FIG. 6, which likewise features an arrangement for injection into the separation plane of the die, the cylinder mount is mounted vertically on the mounting face 15 of the machine frame 1, while the injection unit is attached to an angular mounting bracket 14. Thus, while the axially oriented injection unit can be directly attached to the rear transverse face of the cylinder mount 2, the radially arranged injection unit must be mounted on either a carriage or a fixed bracket. In the examples shown in FIGS. 4, 6 and 7, the cylinder mount 2 is directly attached to the vertical mounting face 15 of the machine frame 1, in the first example with an axial injection unit 3, and in the latter two examples with a radially arranged injection unit. In the example of FIG. 7, the radial injection unit 3 is mounted on a vertically movable carriage 13 which allows vertical adjustment of the axis of the injection unit to the separation plane of the molding die.

As can be seen in FIG. 3, the injection unit 3 includes at its forward end two spaced mounting arms which engage matching mounting ears 2'' of the cylinder mount 2. It is also possible, on the other hand, to mount the injection unit on the two hydraulic cylinders 9 which provide the opening motion for the molding die and which are mounted coaxially to the actuating cylinders on the cylinder mount. The cylinders 9, in this case, would carry appropriate mounting and centering elements (not shown) for the attachment of the injection unit.

It should be understood that it is not absolutely necessary that the mounting faces 15 and 16 of the machine frame 1 are arranged adjacent to a common transverse edge of the machine frame. In certain cases it may be indicated, for example, to provide a horizontal mounting face 16 adjacent to the forward upper transverse edge and to have the vertical mounting face arranged adjacent to the rear upper transverse edge of the machine frame 1, or vice-versa.

A variety of possibilities exist to attach the radially oriented injection unit which is aligned with the separation plane of the molding die to the die-actuating unit 2, 6, 8, 9, using one of the special mounting elements 13, 14, 20, or 30. These special mounting elements to which the injection unit 3 is attached may be in turn attached to either the cylinder mount or to the machine frame, or to both. The mounting elements 2' of the cylinder mount are so arranged that the latter may be mounted either directly onto one of the mounting faces 15 or 16 of the machine frame 1 or that it may be attached to one of the faces of the special mounting elements 13, 14, 20, or 30.

In FIGS. 30 to 33 is shown a modified version of the machine frame where the latter includes two upstanding mounting ledges 34 for the attachment of the die-actuating unit and/or the injection unit. These upstanding mounting ledges consist of flat, angular pieces which are arranged on the outer edges of, and perpendicularly to the mounting faces 15 and 16. They extend a certain height over the adjacent mounting faces on the upper side and front side, respectively, Of the machine frame.

In the following will be described various versions of injection machine assemblies which include a special mounting element 13, 14, 20, or 30, respectively. This special mounting element consists Of two symmetrical portions arranged in alignment with the symmetry axis of the injection molding machine (FIGS. 20 to 26, 29), the two symmetrical portions of the mounting element being in some cases linked together to form a rigid structure by means of transverse cross links (FIGS. 21, 23, 25, 29).

Figure 29:
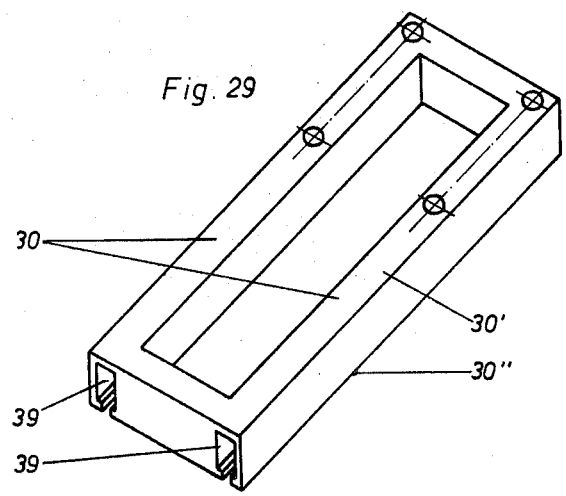
FIG. 29 shows, in an enlarged cross-sectional view, the bar-shaped mounting element of the machine of FIG. 26.
Figure 30:
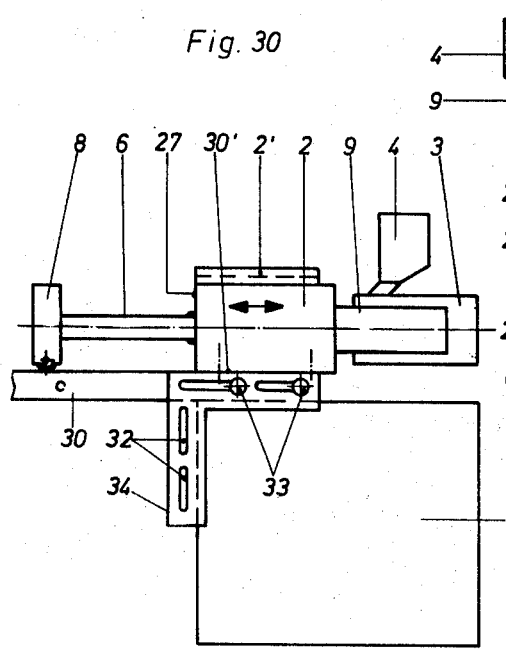
FIG. 30 shows a modification of the embodiment of FIGS. 26 to 28, with different fixed mounting elements on the machine frame.
Figure 31:
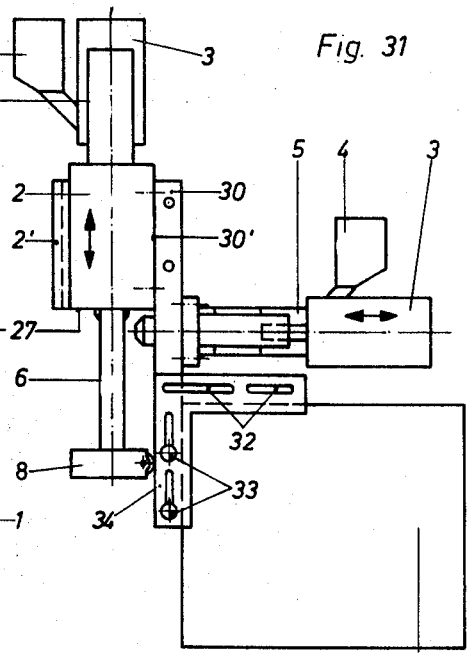
FIGS. 31 and 32 show two alternative mounting arrangements of the machine embodiment of FIG. 30.
Figure 32:
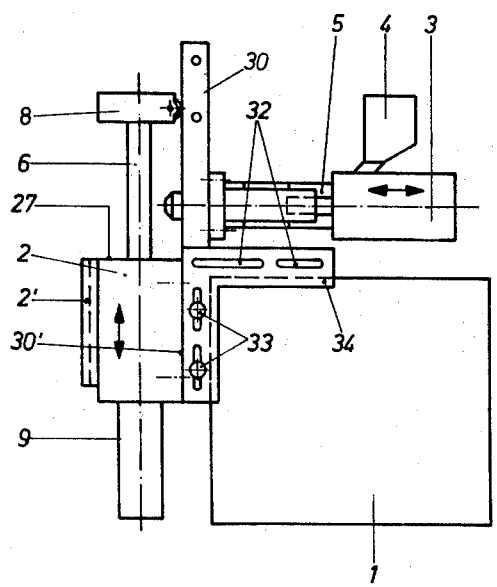
Figure 33:
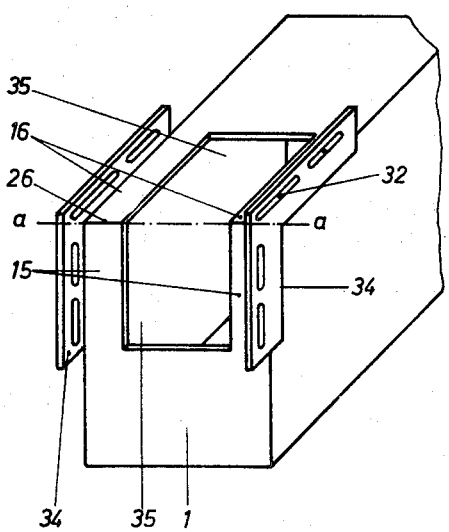
FIG. 33 shows in a perspective view the fixed mounting elements of the machine frame of the embodiment of FIG. 30.

The mounting element used in the assembly of FIGS. 26 to 33 consists of a flat element 31 which is bar-shaped in side view and which has the outline of a closed frame in plane view (FIG. 29).

In the embodiment of FIGS. 10, 24, 25 and 26 the mounting element is L-shaped in side view, while in the embodiment of FIGS. 5, 7, 13, 14, 22 and 23 the mounting element 13 is T-shaped. Lastly, in the embodiment of FIGS. 15 to 21, the mounting element 20 is P-shaped.

Each of the mounting elements 13, 14 and 20 includes at least two mounting legs which are perpendicular to one another. In each of the mounting elements 13, 14 and 20 the legs which carry the centering ears 14'' 13', 25 for the injection unit is arranged perpendicularly to the leg with the mounting faces (14', 13'', 13''', 23 and 24, respectively), the latter serving for the attachment to either the cylinder mount or to the machine frame. These centering ears 14'' (FIGS. 24, 25) and 13' (FIGS. 22, 23) and 25 (FIGS. 20, 21) are integral parts of the respective mounting elements, and they include centering bores for the attachment of the mounting legs of the injection unit 3. In each case the centering ears extend away frem their respective legs toward the center axis of the injection molding machine.

In the embodiment of FIGS. 27, 28, 31, 32 the injection unit 3 is mounted on the vertical mounting element 13 by means of a special centering element 38. This centering element 38 can be clamped to the mounting element 13 at any desired level. For this purpose, the mounting element 13 includes longitudinal T-shaped grooves 39 (FIG. 29) inside which are retained matching nuts which hold the clamping bolts.

In the embodiments shown in FIGS. 26 to 32 the flat frame-shaped mounting element 30 also serves as a support for the movable die bracket 8. Each of the mounting elements 13, 14, 20, 30 has parallel upper and lower mounting faces on each of its two longitudinal legs, and these faces are matching with either the cylinder mount or the mounting faces on the machine frame. The mounting faces on the mounting elements are so arranged that the cylinder mount 2 may be attached hereto in one of two different positions, permitting a rotation of the cylinder mount by 180° around its longitudinal axis (FIGS. 4 or 6, 7 and 13, 14 or 31, 32).

Figure 15:
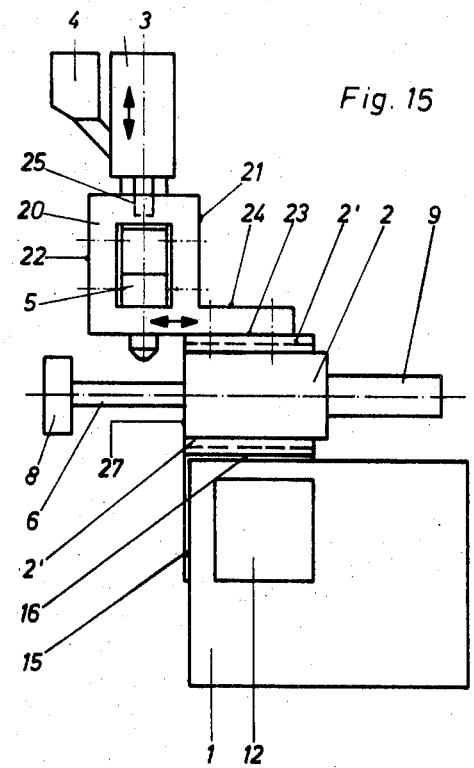
FIG. 15 shows in an elevational front view another injection molding machine with a P-shaped mounting bracket, representing a third embodiment of the invention.

In the embodiments shown in FIGS. 1 to 3, 5, 15, 18, 26 and 30 the cylinder mount 2, which in some cases does, and in others does not carry an axial injection unit 3, is directly mounted to the horizontal mounting face 16 of the machine frame 1. This arrangement permits, by means of the mounting element 13 or 20, respectively, to attach an additional radial injection unit 3 to the cylinder mount in alignment with the separation plane of the injection molding die 28, 29 (FIGS. 5, 15). This arrangement permits simultaneous use of an axial and a radial injection unit. In the embodiment of FIGS. 4 and 6 the cylinder mount, which may or may not carry an axial injection unit, is directly attached to the vertical mounting face 15 of the machine frame 1. In this case it may be indicated to also use a radial injection unit which is aligned with the partition plane of the molding die and which is attached to the cylinder mount 2 by means of the mounting element, whereby the injection unit is attached to that side of the cylinder mount which is opposite to the side by which it is attached to the machine frame (not shown).

Figure 14:
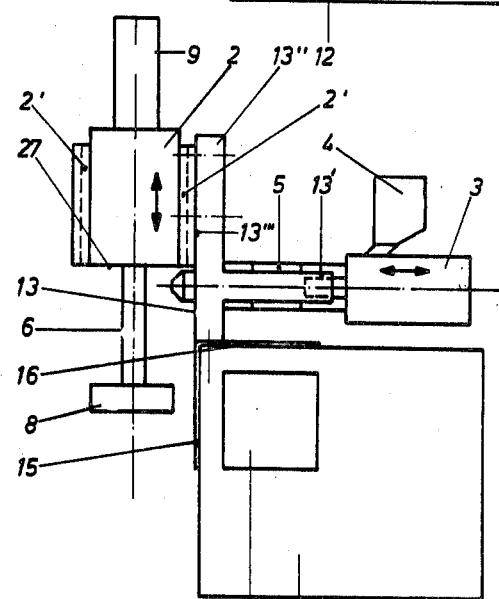
Figure 16:
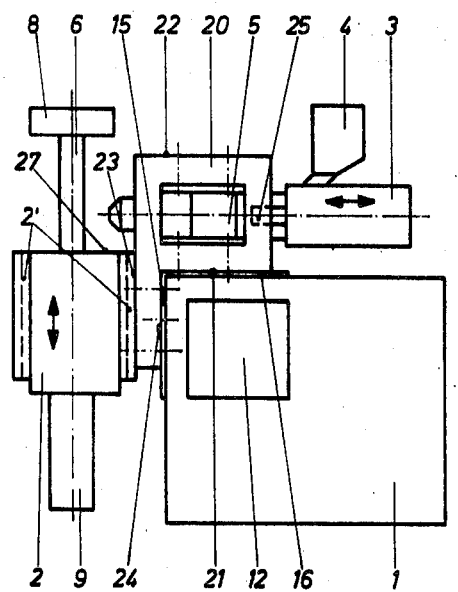
Figures 17, 18:
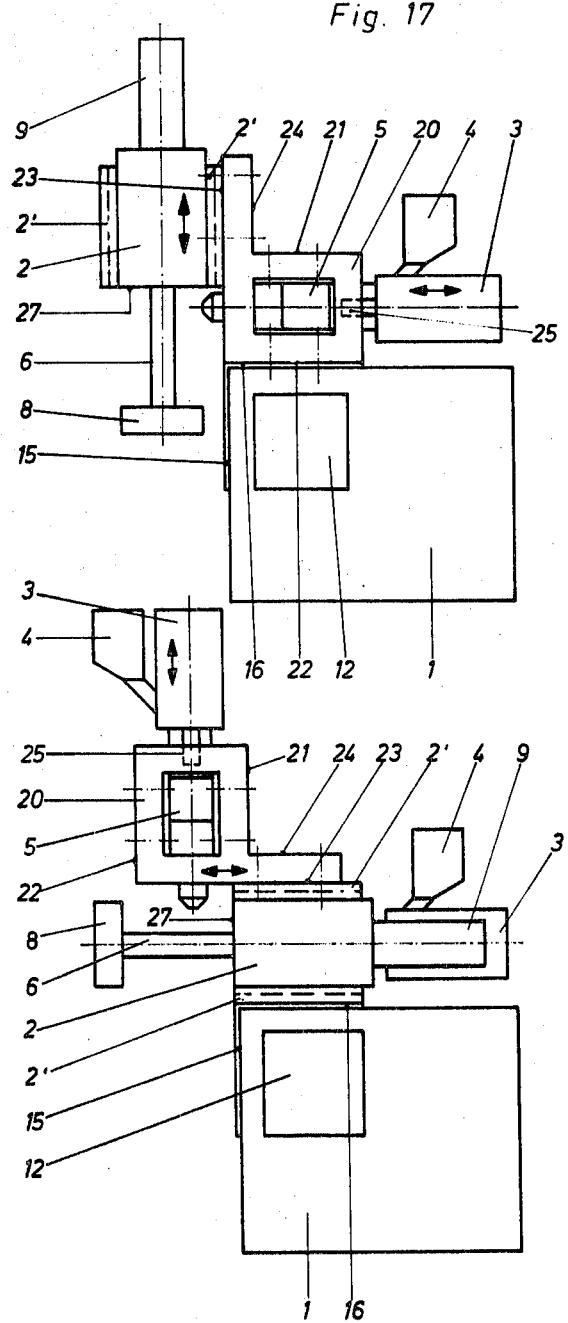
Figure 26:
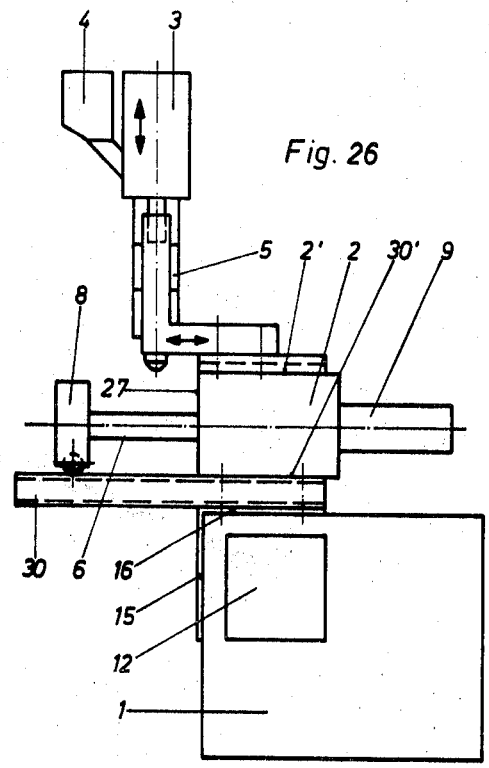
FIG. 26 shows in an elevational front view an injection molding machine with a bar-shaped mounting element, representing still another embodiment of the invention.
Figure 28:
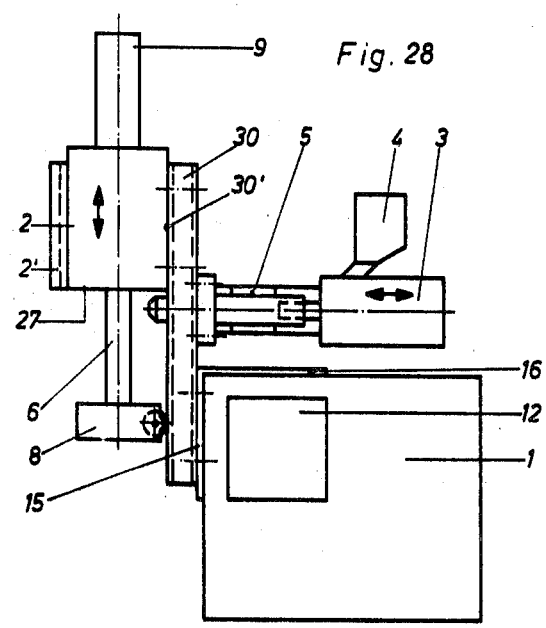
FIGS. 27 and 28 show the injection molding machne of FIG. 26 in two alternative mounting arrangements.
Figure 27:
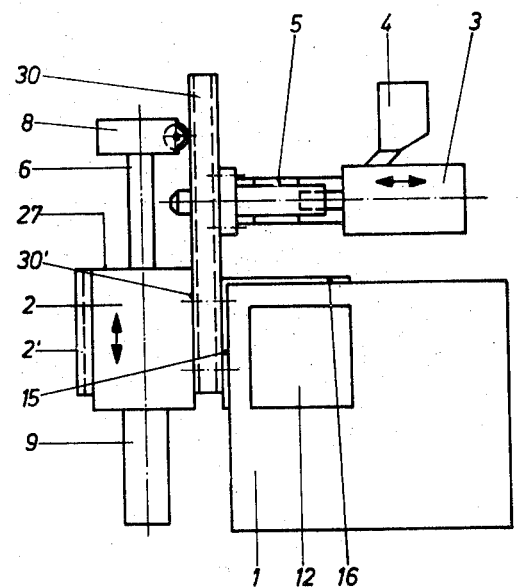

In the embodiment of FIGS. 14 and 16 a radial injection unit 3, in alignment with the separation plane of the molding die, is mounted on the horizontal mounting face 16 of the machine frame by means of a mounting element 13 or 18, respectively.

In the embodiment shown in FIGS. 12, 13, 16, 19, 27, 32, the vertically aligned cylinder mount is so attached to the legs of a mounting element 13, 20 or 30, respectively, and to the vertical mounting face 15 of the machine frame that the transverse face 27 of the cylinder mount which carries the stationary portion 28 of the molding die faces upwardly. The mounting elements 13, 20 and 30, in each case, carry a radial injection unit which is aligned with the separation plane of the molding die.

In the embodiments shown in FIGS. 12 and 19, a radial injection unit 3, aligned with the separation plane of the die, is attached by means of a mounting element 13 or 20, respectively, to that side of the cylinder mount 2 which is opposite to the side by which it is attached to the machine frame.

In the embodiments shown in FIGS. 14, 17, 28, 31, the cylinder mount 2 is arranged vertically with its transverse end face 27 pointing downwardly so that the radial injection unit 3 which is aligned with the separation plane of the die 28,29 and attached by means of the mounting element 13, 20, or 30, respectively, to the cylinder mount 2 is positioned above the injection unit 3. The injection unit, however, is still above the bottom plane of the machine frame.

It should be noted that the additional support of the movable die bracket 8 on a supporting face of the extended mounting element 13 (FIGS. 26 to 32) is especially advantageous in connection with heavy machines. In such cases, the movable die bracket 8 includes support rollers which run against a face of the mounting element 13. This arrangement prevents any undesirable bending on the piston rods 6 which carry the movable die bracket 8.

In the embodiment of FIGS. 30 to 33 the upstanding mounting ledges 34 include elongated holes 32, thereby permitting in a very simple manner an axial adjustment of the cylinder mount 2. In this case the screws 33 may directly engage threaded holes in either the cylinder mount or the mounting element, without the requirement of T-shaped grooves and matching nuts.

What is claimed is:

1. An injection molding machine capable of conversion to several different assembly configurations comprising in combination:
   a. a machine frame with matching horizontal and vertical mounting faces on its outside adjacent to an upper transverse edge of the frame;
   b. a die-actuating unit mountable on either of the mounting faces of the machine frame, the die actuating unit including a cylinder mount and at least two parallel, spaced hydraulic die-actuating cylinders formed by the cylinder mount in such a way that the reciprocating piston rods of the die-actuating cylinders extend forwardly from the cylinder mount;
   c. an injection molding die mounted on the die-actuating unit, the molding die including a stationary die portion attached to the forward side of the cylinder mount and a movable die portion attached to the forward ends of the reciprocating piston rods, the die-actuating cylinder thus effecting the opening and closing of the injection molding die;
   d. at least one injection unit being mountable in a first alignment position relative to the molding die for axial injection thereinto and in a second alignment position relative to the molding die for radial injection thereinto;
   e. means for mounting the die-actuating unit on one of the mounting faces of the machine frame; and
   f. means for mounting the injection unit in one of the two alignment positions relative to the injection molding die.

2. An injection molding machine as defined in claim 1, wherein
   the machine frame is of a generally rectangular block-shaped outline with parallel side walls, the two mounting faces on the machine frame including each two spaced, longitudinal face portions extending alongside two opposite vertical side walls of the machine frame, the machine frame being reinforced in the area of the face portions and each face portion including a row of mounting bores therethrough.

3. An injection molding machine as defined in claim 2, wherein
   the outer longitudinal edges of the face portions of the two mounting faces are approximately aligned with the two vertical side walls.

4. An injection molding machine as defined in claim 2, wherein
   the inner longitudinal edges of the face portions of the two mounting faces are approximately aligned with the two vertical side walls, the machine frame including a laterally extending ledge in the peripheral area outside the face portions along at least the upper edge and the two vertical edges of the two vertical side walls.

5. An injection molding machine as defined in claim 3, wherein
   the two vertical side walls include underneath the two mounting faces transverse openings through the vertical side walls to facilitate access to the mounting bores from the inside of the mounting faces.

6. An injection molding machine as defined in claim 1, wherein
the mounting means for the injection unit includes two forwardly extending parallel spaced centering prongs on opposite sides of the plastifying cylinder, the die-actuating unit including matching centering ears on the cylinder mount for engagement by the centering prongs to hold the injection unit in the first, axial alignment position.

7. An injection molding machine as defined in claim 6, wherein
the cylinder mount of the die-actuating means is of a generally rectangular block-shaped outline with at least two opposite longitudinal side faces which are parallel to the axes of the die-actuating cylinders, and
the mounting means for the die-actuating unit includes on at least one longitudinal side face of the cylinder mount two spaced longitudinal T-shaped mounting grooves in alignment with the mounting bores of the mounting faces, the mounting grooves being arranged to receive T-shaped threaded nuts which are engaged by clamping bolts extending outwardly through the mounting bores, the longitudinal adjustability of the threaded nuts inside the mounting grooves permitting an axial adjustment of the die-actuating unit relative to the machine frame.

8. An injection molding machine as defined in claim 7, wherein
two opposite longitudinal side faces of the cylinder mount include similar symmetrically arranged mounting grooves, thus permitting an alternate attachment of the cylinder mount to the machine frame in a position in which the cylinder mount is 180° rotated around its longitudinal axis.

9. An injection molding machine as defined in claim 7, wherein
the mounting means for the injection unit further includes an angular mounting bracket, the latter having at least one pair of parallel spaced mounting legs with rows of mounting bores matching the bores in the mounting faces of the machine frame and with the grooves of the cylinder mount, the angular mounting bracket being clampable to either the cylinder mount or the machine frame, or to both of them simultaneously, and further including two spaced centering ears for mounting the injection unit in the second, radial alignment position relative to the injection molding die in alignment with the separation plane between the stationary and movable die portions, when the die is closed.

10. An injection molding machine as defined in claim 9, wherein
the mounting means for the die-actuating unit further includes a mounting bracket, the latter having at least one pair of parallel, spaced mounting legs with rows of mounting bores matching the bores in the mountinG faces of the machine frame and the grooves of the cylinder mount, the mounting bracket being clampable intermediate the cylinder mount and the machine frame.

11. An injection molding machine as defined in claim 10, wherein
the angular mounting bracket for the injection unit and the mounting bracket for the die-actuating unit are combined in one angular mounting bracket which has at least two pairs of parallel, spaced mounting legs extending at right angles to one another.

12. An injection molding machine as defined in claim 11, wherein
the combined angular mounting bracket includes a flat, elongated bracket with two parallel mounting faces for the die-actuating unit, the angular mounting bracket for the injection unit being removably attached to one of the mounting faces of the flat bracket and arranged for longitudinal adjustment relative thereto.

13. An injection molding machine as defined in claim 12, wherein
the flat elongated bracket for the die-actuating unit comprises two longitudinal side profiles serving as mounting legs for the die-actuating unit, and a cross link at each end of the bracket thus giving it the outline of a flat frame.

14. An injection molding machine as defined in claim 11, wherein
the combined angular mounting bracket includes two like angular side profiles representing the mounting legs for the injection unit and for the die-actuating unit, and at least one transverse cross link connecting and rigidifying the side profiles.

15. An injection molding machine as defined in claim 14, wherein
the angular side profiles of the combined mounting bracket have an L-shaped outline.

16. An injection molding machine as defined in claim 14, wherein
the angular side profiles of the combined mounting bracket have a T-shaped outline.

17. An injection molding machine as defined in claim 14, wherein
the angular side profiles of the combined mounting bracket haVe a P-shaped outline, the radius of the "P" being replaced by two additional corners.

18. An injection molding machine as defined in claim 14, wherein
the combined angular mounting bracket further includes in each side profile a centering ear for engagement by one of the centering prongs of the injection unit, the plane comprising the axes of the centering ears being perpendicular to two of the mounting legs for the die-actuating unit.

19. An injection-molding machine as defined in claim 14, wherein
the mounting legs of the combined angular mounting bracket are rectangular in cross section to permit attachment thereof to the cylinder mount and to the machine frame from either one of two opposite side of the mounting legs.

20. An injection molding machine as defined in claim 10, further comprising
means for supporting the reciprocating piston rods on their forward ends against the spaced mounting legs of the mounting bracket for the die-actuating unit, the supporting means including at least one roller and the mounting bracket having a flat face in contact with the roller and extending over the range of roller travel during reciprocation of the die-actuating pistons.

21. An injection molding machine as defined in claim 1, wherein
the machine frame is of a generally rectangular block-shaped outline with parallel side walls, the two mounting faces on the machine frame including each two spaced, longitudinal face portions extending alongside two opposite vertical side walls of the machine frame; the machine frame further including on each of the aforementioned opposite vertical side walls an upstanding mounting ledge bordering the outside edges of the longitudinal face portions, the mounting ledges including each a plurality of oblong holes for the insertion of horizontal attachment bolts therethrough.

* * * * *